United States Patent
Staal et al.

(10) Patent No.: US 12,275,483 B1
(45) Date of Patent: Apr. 15, 2025

(54) HANDLEBAR LATCHING MECHANISM FOR PERSONAL TRANSPORT DEVICE

(71) Applicant: Honda Motor Co., Ltd., Tokyo (JP)

(72) Inventors: Matthew B. Staal, Torrance, CA (US); Jackie P. Porchay, Torrance, CA (US); Michael Jin Kim, Long Beach, CA (US); Ming Hsein Lee, Taichung (TW); Ding Jong Chou, Taichung (TW); Sheng Yu Huang, Taichung (TW)

(73) Assignee: HONDA MOTOR CO., LTD., Tokyo (JP)

( * ) Notice: Subject to any disclaimer, the term of this patent is extended or adjusted under 35 U.S.C. 154(b) by 700 days.

(21) Appl. No.: 17/509,335

(22) Filed: Oct. 25, 2021

(51) Int. Cl.
*B62K 21/22* (2006.01)
*B62K 15/00* (2006.01)
*B62K 21/16* (2006.01)

(52) U.S. Cl.
CPC .............. *B62K 21/22* (2013.01); *B62K 15/00* (2013.01); *B62K 21/16* (2013.01)

(58) Field of Classification Search
CPC ......... B62K 15/00; B62K 21/16; B62K 21/22
USPC ....................................................... 280/263
See application file for complete search history.

(56) References Cited

U.S. PATENT DOCUMENTS

| | | | |
|---|---|---|---|
| 7,296,813 B2 | 11/2007 | Montague et al. | |
| 10,414,459 B2 | 9/2019 | Teal et al. | |
| 2003/0052470 A1* | 3/2003 | Lee | B62K 21/22 280/281.1 |
| 2019/0009856 A1 | 1/2019 | Chong | |
| 2021/0001949 A1 | 1/2021 | Chan et al. | |

FOREIGN PATENT DOCUMENTS

| | | |
|---|---|---|
| CN | 102085895 B | 4/2013 |
| CN | 203934783 U | 11/2014 |
| CN | 204801998 U | 11/2015 |
| CN | 105270548 A | 1/2016 |
| CN | 205022794 U | 2/2016 |
| CN | 106672140 A | 5/2017 |
| CN | 107140098 A | 9/2017 |
| CN | 206954298 U | 2/2018 |
| CN | 207466879 U | 6/2018 |
| CN | 105752247 B | 8/2018 |
| CN | 208647071 U | 3/2019 |
| CN | 210503023 U | 5/2020 |
| WO | 2019115889 A1 | 6/2019 |

* cited by examiner

*Primary Examiner* — Kevin Hurley
*Assistant Examiner* — Felicia L. Brittman-Alabi
(74) *Attorney, Agent, or Firm* — Plumsea Law Group, LLC (57) ABSTRACT

A compact personal transport device convertible between a riding configuration and a stowed configuration is described. In one embodiment, a steering assembly for the compact personal transport device includes a telescopic steering shaft, a neck disposed at a top of the telescopic steering shaft, and a rotatable collar connected via a rotation mechanism to the neck. A handlebar is secured to the rotatable collar and the steering assembly also includes a handlebar latching mechanism. In a locked configuration, the handlebar latching mechanism secures the rotatable collar from being rotated. In an unlocked configuration, the handlebar latching mechanism permits the rotatable collar to rotate relative to the neck.

20 Claims, 11 Drawing Sheets

HANDLEBAR LATCHING MECHANISM FOR PERSONAL TRANSPORT DEVICE

BACKGROUND

This disclosure relates generally to vehicles, and in particular to a handlebar latching mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a steering assembly for a personal transport device is provided. The steering assembly includes a telescopic steering shaft, a neck disposed at a top of the telescopic steering shaft, and a rotatable collar connected via a rotation mechanism to the neck. A handlebar is secured to the rotatable collar and the steering assembly also includes a handlebar latching mechanism. In a locked configuration, the handlebar latching mechanism secures the rotatable collar from being rotated. In an unlocked configuration, the handlebar latching mechanism permits the rotatable collar to rotate relative to the neck.

In another aspect, a handlebar latching mechanism for a steering assembly of a personal transport device is provided. The handlebar latching mechanism includes a lever, a locking tab disposed within a groove of the lever, and a pin. The pin has an end configured to fit into a receiving aperture in a face surface of a neck of the steering assembly. A rotatable collar is connected to the neck via a rotation mechanism. The lever is configured to pull outwards away from the steering assembly to move the end of the pin out of the receiving aperture and permit the rotatable collar to rotate relative to the neck via the rotation mechanism.

In another aspect, a compact personal transport device is provided. The compact personal transport device includes an outer casing extending between a top edge and a bottom edge in a vertical direction and extending between a front edge and a rear edge in a horizontal direction. An opening is disposed along a top surface of the outer casing. The compact personal transport device also includes a steering assembly configured to steer a front wheel of the compact personal transport device. The steering assembly includes an upper portion extending a first height above the top surface of the outer casing when the compact personal transport device is in a riding configuration. The steering assembly includes a telescopic steering shaft, a neck disposed at a top of the telescopic steering shaft, and a rotatable collar connected via a rotation mechanism to the neck. A handlebar is secured to the rotatable collar and the steering assembly also includes a handlebar latching mechanism. in a locked configuration, the handlebar latching mechanism secures the rotatable collar from being rotated. In an unlocked configuration, the handlebar latching mechanism permits the rotatable collar to rotate relative to the neck.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a handlebar latching mechanism that assists with converting or transitioning the personal transport device between a riding configuration and a stowed configuration are described herein. The techniques described in connection with the present embodiments may be used to provide a personal transport device having a convenient handlebar latching mechanism that allows a user to quickly collapse the steering assembly to convert the device from a riding configuration to a stowed configuration. In the stowed configuration, the personal transport device has a compact form factor that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stored inside the outer casing.

Figure 1:
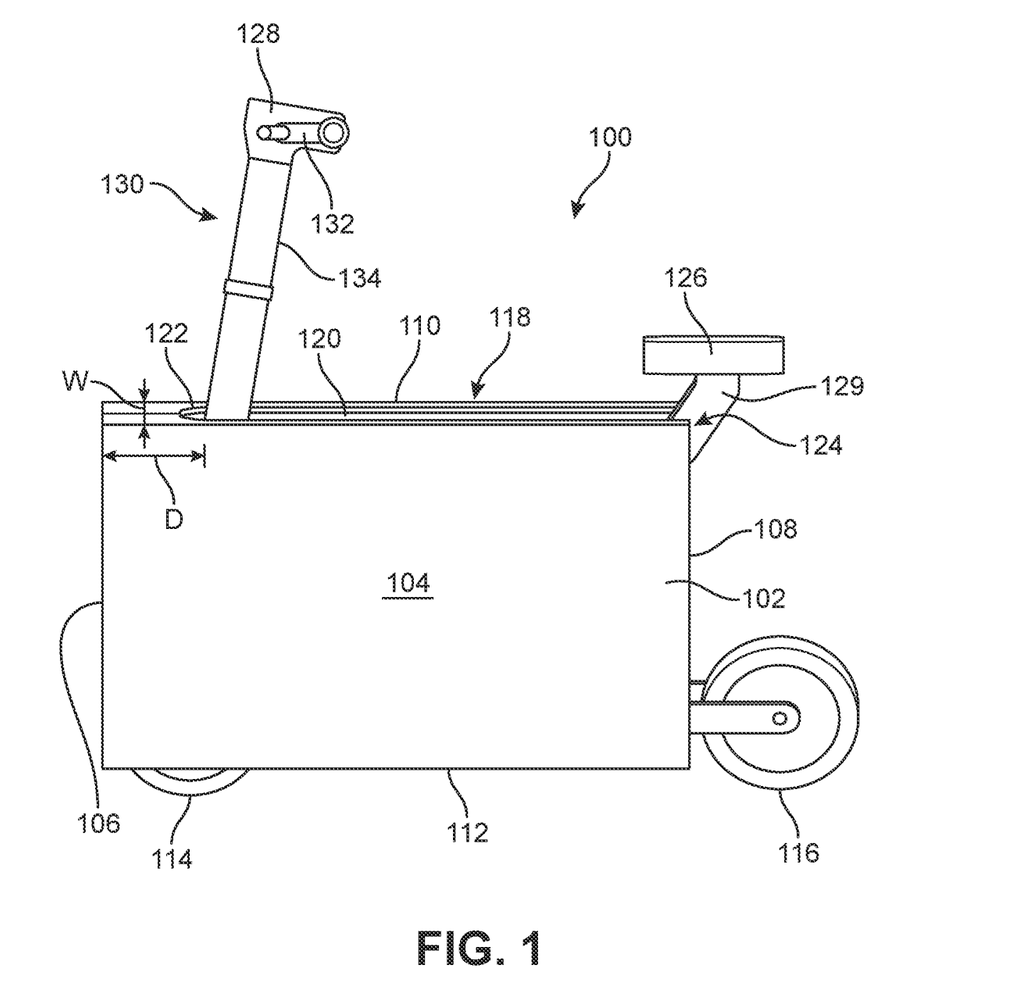
FIG. 1 is a side view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stored positions inside outer casing 102. As shown in FIG. 1, electric scooter 100 is in the riding configuration (FIG. 9, described in detail below, shows electric scooter 100 in the stowed configuration).

In this embodiment, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface. Outer casing 102 of electric scooter 100 extends between a front edge 106 and an opposite rear edge 108, as well as a top edge 110 and an opposite bottom edge 112. Front edge 106, rear edge 108, top edge 110, and bottom edge 112 are substantially straight and define an outer perimeter of rectangular-shaped outer casing 102 of electric scooter 100.

In this embodiment, a front wheel 114 is visible along bottom edge 112 of electric scooter 100 near front edge 106. Electric scooter 100 also includes a rear wheel 116 that is shown extended outside of outer casing 102 (i.e., in the riding configuration as shown in FIG. 1) along bottom edge 112 near rear edge 108. Rear wheel 116 is configured to slide or retract inside of outer casing 102 in the stowed configuration.

Electric scooter 100 includes a top surface 118 disposed between first side surface 104 and the opposite second side surface. In an example embodiment, top surface 118 includes an opening 120 extending substantially along the length of electric scooter 100 (i.e., from front edge 106 to rear edge 108). In one embodiment, opening 120 is disposed spaced from front edge 106 of electric scooter 100 and extends all the way to rear edge 108. For example, as shown in FIG. 1, opening 120 extends along top surface 118 from a first end 122 to a second end 124 located at rear edge 108. In this embodiment, first end 122 of opening 120 is spaced from front edge 106 by a distance (D) so that opening 120 is offset on top surface 118. In some embodiments, opening 120 extends to rear edge 108 along top surface 118 and partially extends down rear edge 108. In this embodiment, opening 120 is in the form of a slot disposed between first side surface 104 and the opposite second side surface.

In some embodiments, electric scooter 100 includes components configured to allow a user to ride electric scooter 100 in the riding configuration. For example, in this embodiment, electric scooter 100 includes a seat 126 and a steering assembly 128. In one embodiment, seat 126 is configured to mount to a seat post 129 that is attached internally to the inside of electric scooter 100 (e.g., inside outer casing 102). In one aspect, seat post 129 may be attached inside outer casing 102 via a pivot mechanism. Steering assembly 128 is configured to control orientation of front wheel 114 to allow a user to steer electric scooter 100 in the riding configuration.

In an example embodiment, steering assembly 128 includes a handlebar 132 that is configured to receive hands of a user to steer front wheel 114. In an example embodiment, steering assembly 128 includes a steering shaft 130 with a fork (shown in FIGS. 6-9) that is attached to an axle of front wheel 114 at one end. The opposite end of the fork is attached to a lower portion of steering shaft 130 disposed inside of outer casing 102 of electric scooter 100. Handlebar 132 is located at a top end of steering shaft 130 and is connected to an upper portion 134 of steering shaft 130. Upper portion 134 of steering shaft 130 extends downwards towards top edge 110 of electric scooter 100 and is extended outside of outer casing 102 of electric scooter 100 through opening 120 when electric scooter 100 is in the riding configuration (as shown in FIG. 1).

As shown in FIG. 1, steering shaft 130 of electric scooter 100 extends upwards from opening 120 when electric scooter 100 is in the riding configuration and is configured to be folded downwards into opening 120 to transition electric scooter 100 to the stowed configuration, as will be described below. In this embodiment, handlebar 132 is shown in an extended position with a substantially horizontal orientation so that handlebar 132 is approximately perpendicular to steering shaft 130. Handlebar 132 and steering shaft 130 are configured to allow a user to control orientation of front wheel 114 to steer electric scooter 100 in the riding configuration.

In an example embodiment, one or more portions of steering shaft 130 may be telescopic. That is, one or more portions of steering shaft 130 may be formed of concentric tubular sections designed to slide into one another to collapse or extend steering shaft 130. For example, in one embodiment, upper portion 134 of steering shaft 130 may be telescopic. With this arrangement, a height of steering shaft 130 may be transitioned between a taller height in an extended position when electric scooter 100 is in the riding configuration and a shorter height in a folded position when electric scooter 100 is in the stowed configuration.

Figure 6:
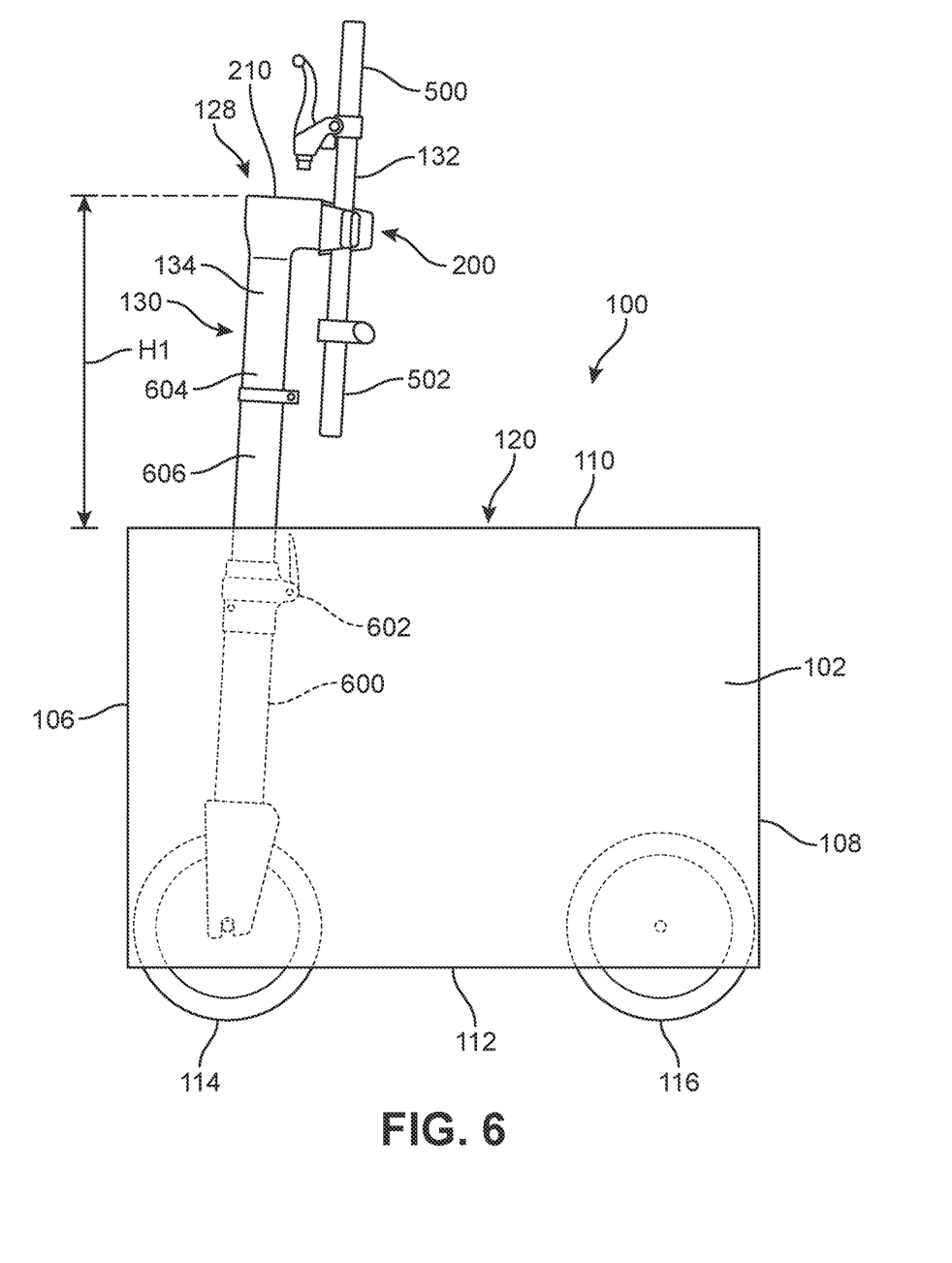
FIG. 6 is a representative side view of the example embodiment of the electric scooter in the process of converting to the stowed configuration in accordance with aspects of the present disclosure.
Figure 9:
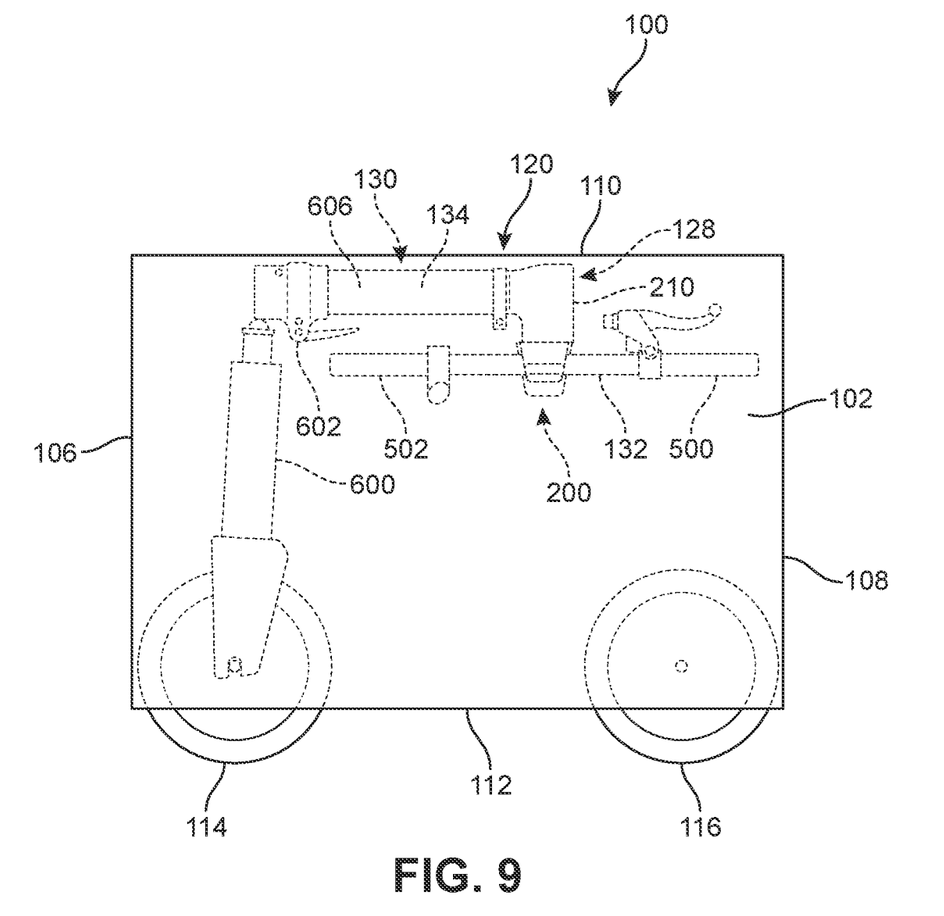
FIG. 9 is a representative view of the example embodiment of the electric scooter in the stowed configuration in accordance with aspects of the present disclosure.

The lower portion of steering shaft 130 extends upwards towards top edge 110 of electric scooter 100 to a shaft connection mechanism that includes a hinge (or similar mechanism) that connects the lower portion and upper portion 134 of steering shaft 130 (as shown in detail in FIG. 6). With this arrangement, steering assembly 128 may be transitioned or converted from an upright extended position when electric scooter 100 is in the riding configuration (as shown in FIG. 1) to a folded position when electric scooter 100 is in the stowed configuration (as shown in FIG. 9).

It should be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described herein.

Figure 2:
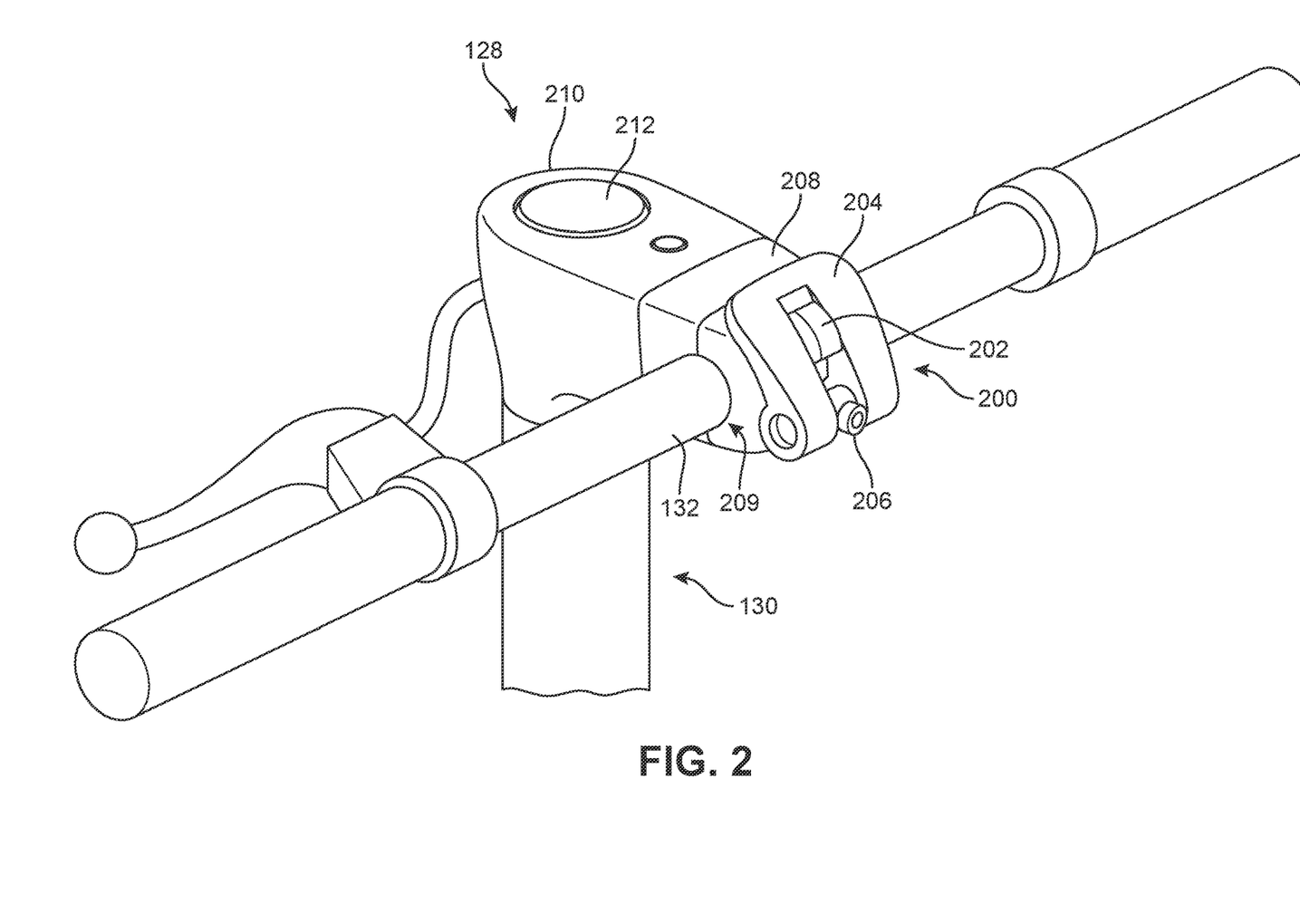
FIG. 2 is an enlarged isometric view of an example embodiment of a steering assembly of the electric scooter including a handlebar latching mechanism in accordance with aspects of the present disclosure.

In some embodiments, electric scooter 100 may include a handlebar latching mechanism that allows a user to quickly collapse steering assembly 128 to transition electric scooter 100 from the riding configuration to the stowed configuration. Referring now to FIG. 2, an enlarged view of steering assembly 128 of electric scooter 100 is shown. In this embodiment, steering assembly 128 includes a handlebar latching mechanism 200 disposed at the top that is configured to allow a user to rotate handlebar 132 from the horizontal orientation in the extended position (i.e., as shown in FIGS. 1 and 2) to a substantially vertical orientation in a stowed position so that handlebar 132 is aligned with or approximately parallel to steering shaft 130. With this arrangement, handlebar 132 and steering shaft 130 may be transitioned from extended positions in the riding configuration to folded positions in the stowed configuration of electric scooter 100.

In some embodiments, handlebar latching mechanism 200 is located at a rear of steering assembly 128 facing towards a user when the user is riding electric scooter 100 in the riding configuration. In an example embodiment, handlebar latching mechanism 200 includes a locking tab 202 disposed within a channel or groove of a lever 204. Locking tab 202 is slidable within the channel or groove of lever 204 to move between a locked position and an unlocked position. In the locked position, locking tab 202 prevents handlebar latching mechanism 200 from being able to rotate. In the unlocked position, handlebar latching mechanism 200 is permitted to rotate to move handlebar 132 from the horizontal orientation to the vertical orientation.

In some embodiments, handlebar latching mechanism 200 further includes a pin 206 that extends forward through portions of handlebar latching mechanism 200 into a rotatable collar 208. Rotatable collar 208 surrounds and holds handlebar 132 in place in both the horizontal orientation and the vertical orientation. For example, rotatable collar 208 includes two concave recessed portions 209 that conform to and secure cylindrical handlebar 132 within steering assembly 128. Rotatable collar 208 is rotatably connected (e.g., via a rotation mechanism) to a neck 210 of steering assembly 128 that is located on top of steering shaft 130.

In some embodiments, steering assembly 128 may include a release mechanism that is configured to allow a user to collapse steering shaft 130 from its extended position to a stored position within outer casing 102 of electric scooter 100. For example, a release mechanism in the form of a release button 212 disposed at the top of neck 210 may engage a locking mechanism that prevents telescopic steering shaft 130 from being able to collapse when steering assembly 128 and electric scooter 100 are in the riding configuration. When a user presses down on release button 212, the locking mechanism releases and steering shaft 130 is permitted to collapse within itself to transition from its taller, extended position when electric scooter 100 is in the riding configuration to its shorter, folded position when electric scooter 100 is in the stowed configuration. In other embodiments, a release mechanism in the form of a release lever may be located on telescopic steering shaft 130. When a user engages the release lever, the locking mechanism releases to allow one or more telescopic portions of steering shaft 130 to collapse or slide into each other, in a similar manner as described above.

Figure 3:
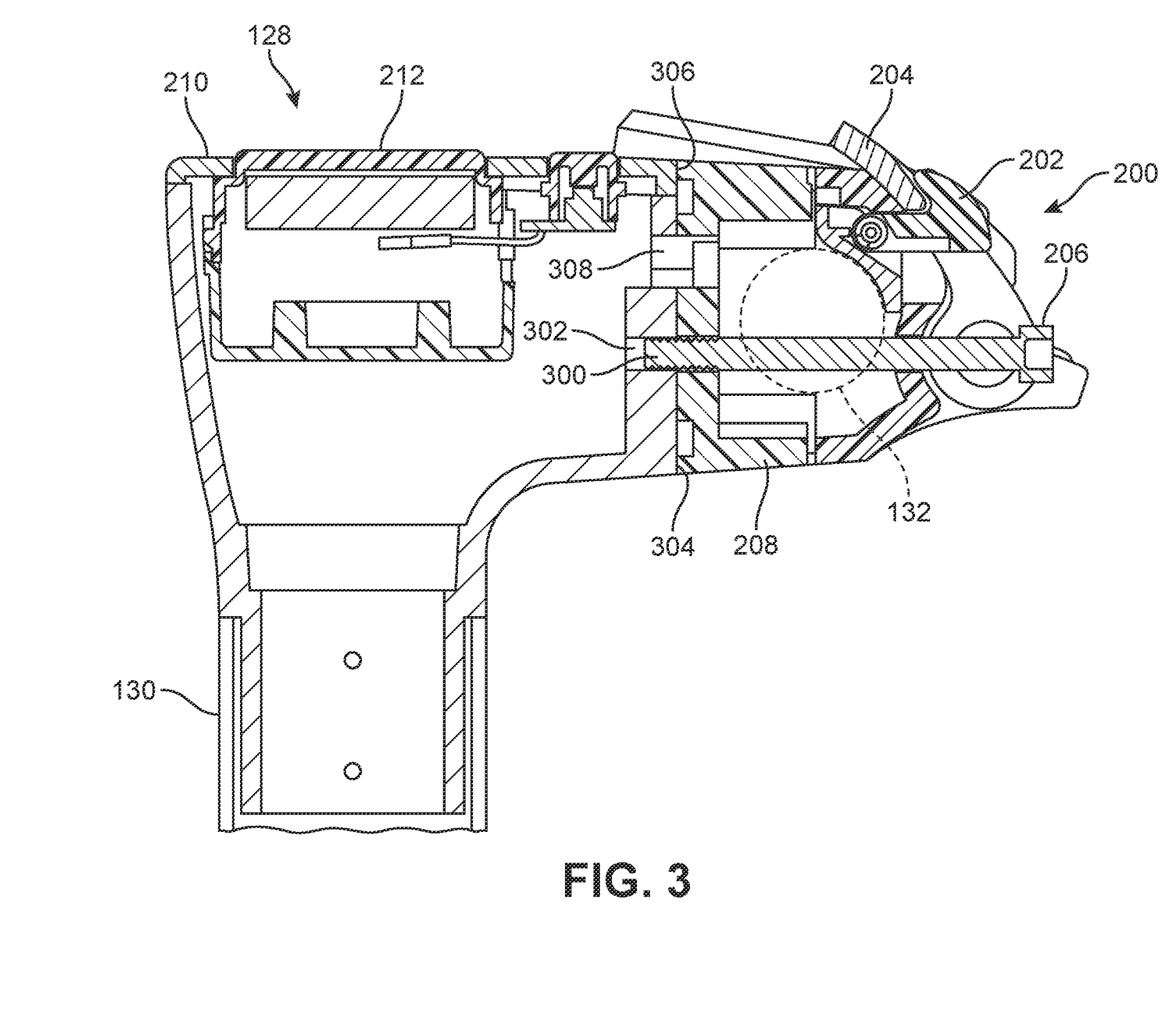
FIG. 3 is a cross-section view of the example embodiment of the steering assembly including the handlebar latching mechanism in a locked configuration in accordance with aspects of the present disclosure.

Referring now to FIG. 3, a cross-section view of steering assembly 128 including components of handlebar latching mechanism 200 are shown with handlebar latching mechanism 200 in a locked configuration. In this embodiment, handlebar latching mechanism 200 is in a locked configuration with locking tab 202 located at the top of the channel or groove of lever 204. In this locked configuration, pin 206 extends through rotatable collar 208 and an end 300 of pin 206 is located within a receiving aperture 302 on a first face surface 304 of neck 210. First face surface 304 of neck 210 faces towards a second face surface 306 of rotatable collar 208. In this embodiment, rotatable collar 208 is connected to neck 210 via a rotation mechanism 308 that permits rotatable collar 208 to rotate relative to neck 210 so that second face surface 306 moves in a clockwise or counter-clockwise direction relative to first face surface 304. With this arrangement, when end 300 of pin 206 is in receiving aperture 302 on first face surface 304 of neck 210, pin 206 prevents rotatable collar 208 from being able to rotate relative to neck 210, thereby keeping handlebar latching mechanism 200 in the locked configuration.

Figure 4:
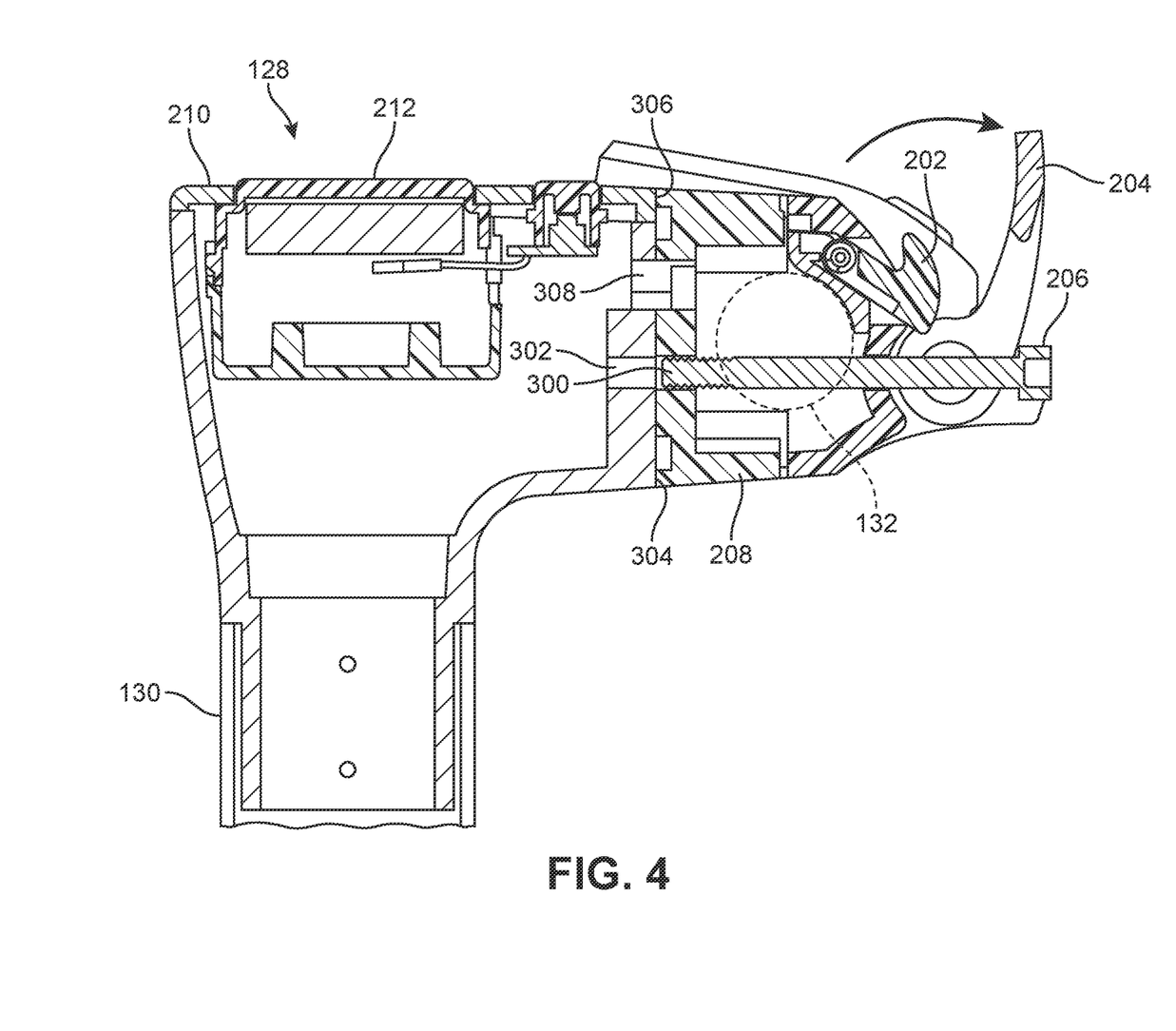
FIG. 4 is a cross-section view of the example embodiment of the steering assembly including the handlebar latching mechanism in an unlocked configuration in accordance with aspects of the present disclosure.

Referring now to FIG. 4, a cross-section view of steering assembly 128 including components of handlebar latching mechanism 200 is shown in an unlocked configuration. In an example embodiment, locking tab 202 slides downward within the groove or channel of lever 204 from the top to the bottom to transition handlebar latching mechanism 200 from the locked configuration (as shown in FIG. 3) to an unlocked configuration, shown here in FIG. 4. Once locking tab 202 is moved downwards to unlock handlebar latching mechanism 200, lever 204 may be pulled outward from its initial position in the locked configuration away from steering assembly 128 to an opened position.

In an example embodiment, movement of lever 204 from its initial position to the opened position acts to pull pin 206 outward (i.e., away from steering assembly 128) so that end 300 of pin 206 pulls out of receiving aperture 302 on first face surface 304 of neck 210. Once end 300 of pin 206 is clear of receiving aperture 302, rotatable collar 208 is able to rotate relative to neck 210 via rotation mechanism 308. With this arrangement, when handlebar latching mechanism 200 is in the unlocked configuration, rotatable collar 208 can be rotated to move handlebar 132 from the horizontal orientation (in the riding configuration) to a vertical orientation (in the stowed configuration).

In an example scenario, a process of unlocking handlebar latching mechanism 200 and rotating handlebar 132 from the horizontal orientation (in the riding configuration) to the vertical orientation (in the stowed configuration) is shown with reference to FIGS. 5A-5F.

Figure 5A:
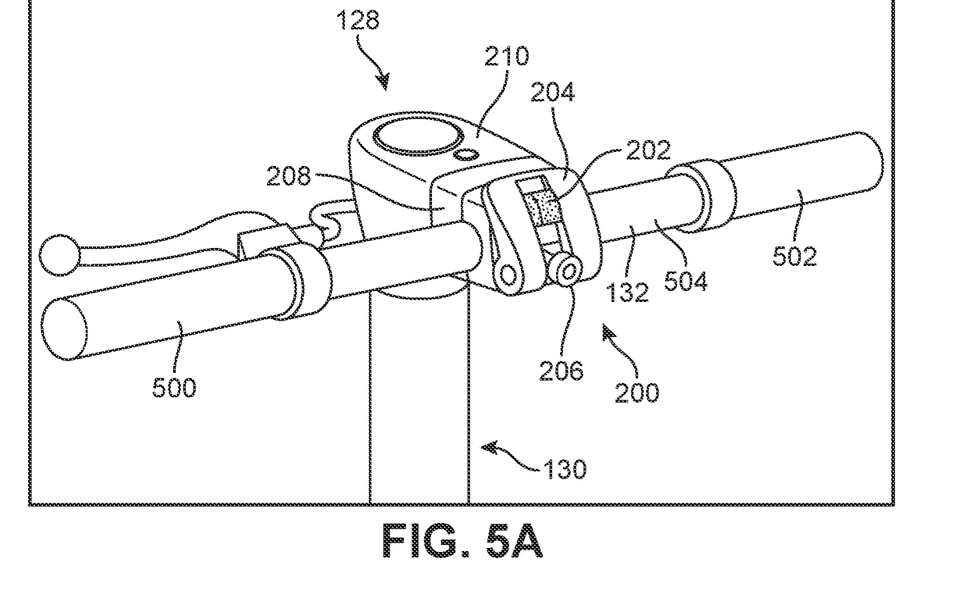
FIGS. 5A-5F illustrate representative views of the example embodiment of the handlebar latching mechanism in use to rotate the handlebars in preparation for converting the electric scooter to a stowed configuration in accordance with aspects of the present disclosure.

Referring now to FIG. 5A, steering assembly 128 of electric scooter 100 is shown in a first view. In this embodiment, electric scooter 100 is in the riding configuration with handlebar 132 in a horizontal orientation (e.g., perpendicular to steering shaft 130) and steering shaft 130 extended outside of outer casing 102 so that a user may ride electric scooter 100. In an example embodiment, handlebar 132 includes a generally cylindrical shaft 504 with a first end 500 and an opposite second end 502. Handlebar 132 also includes a pair of grips configured to allow a user to grab and hold onto handlebar 132 to steer electric scooter 100. In this embodiment, handlebar 132 includes a grip at first end 500 and another grip at the opposite second end 502.

In the first view shown in FIG. 5A, locking tab 202 is in a locked position at the top of the channel or groove in lever 204. With locking tab 202 in the locked position, handlebar latching mechanism 200 is in a locked configuration and rotatable collar 208 is secured so that handlebar 132 remains in the horizontal orientation to allow a user to ride electric scooter 100.

Figure 5B:
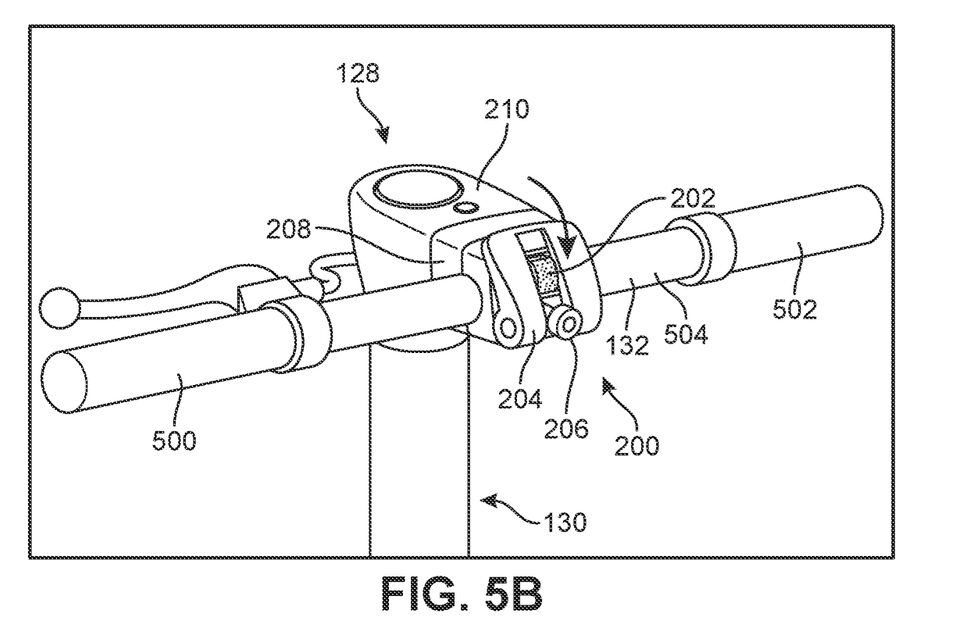

Next, referring to FIG. 5B, locking tab 202 is moved downward from its initial locked position the top of the channel or groove in lever 204 towards pin 206 to an unlocked position. Moving locking tab 202 from the locked position to the unlocked position transitions handlebar latching mechanism 200 from the locked configuration (as shown in FIG. 5A) to an unlocked configuration, shown here in FIG. 5B. Once locking tab 202 is moved downwards to unlock handlebar latching mechanism 200, lever 204 may be pulled outward from its initial position in the locked configuration away from steering assembly 128 to an opened position, as shown in FIG. 5C.

Figure 5C:
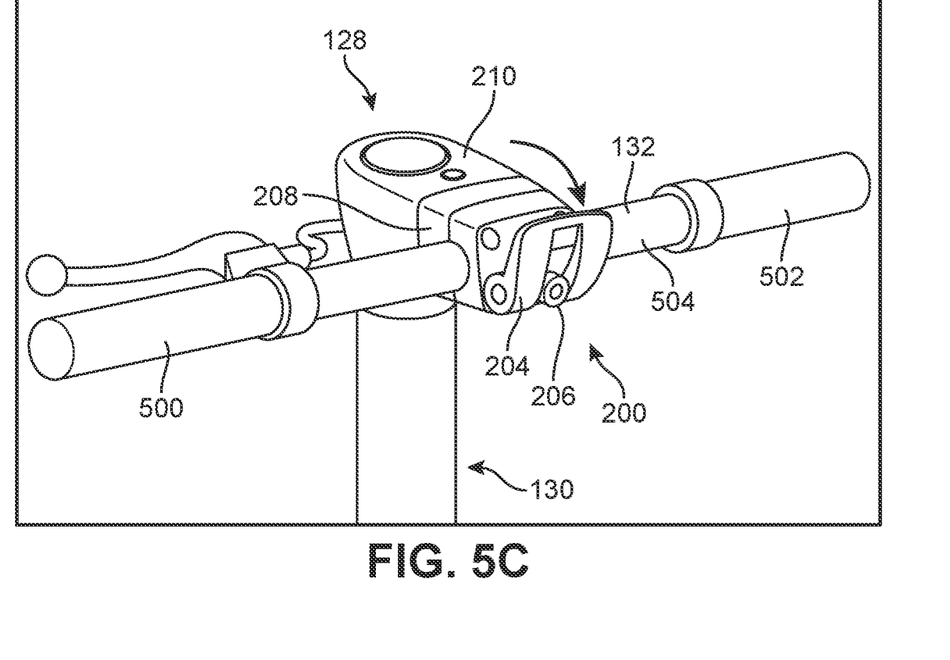

As shown in FIG. 5C, pulling lever 204 of handlebar latching mechanism 200 outward causes pin 206 to also move outward away from steering assembly 128. This movement of pin 206 slides end 300 of pin 206 out of receiving aperture 302 of neck 210 (as shown above in reference to FIG. 4). Once end 300 of pin 206 is clear of receiving aperture 302, rotatable collar 208 is able to rotate relative to neck 210.

Figure 5D:
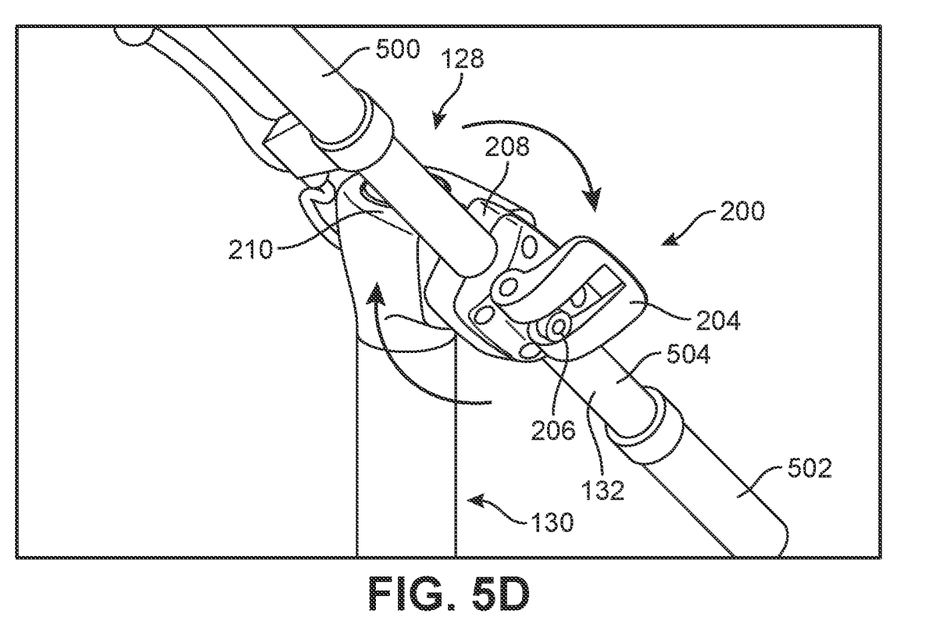

For example, as shown in FIG. 5D, rotatable collar 208 rotates in a clockwise direction to move handlebar 132 from the horizontal orientation when electric scooter 100 is in the riding configuration towards a vertical orientation. In this embodiment, as rotatable collar 208 rotates relative to neck 210 of steering assembly 128 (e.g., via rotation mechanism 308, described above), first end 500 of shaft 504 of handlebar 132 moves upwards and second end 502 of shaft 504 of handlebar 132 moves downward in the opposite direction. It should be understood that in some embodiments, rotatable collar 208 may operate to rotate in a clockwise direction, a counterclockwise direction, or may operate to rotate in both clockwise and counterclockwise directions.

Figure 5E:
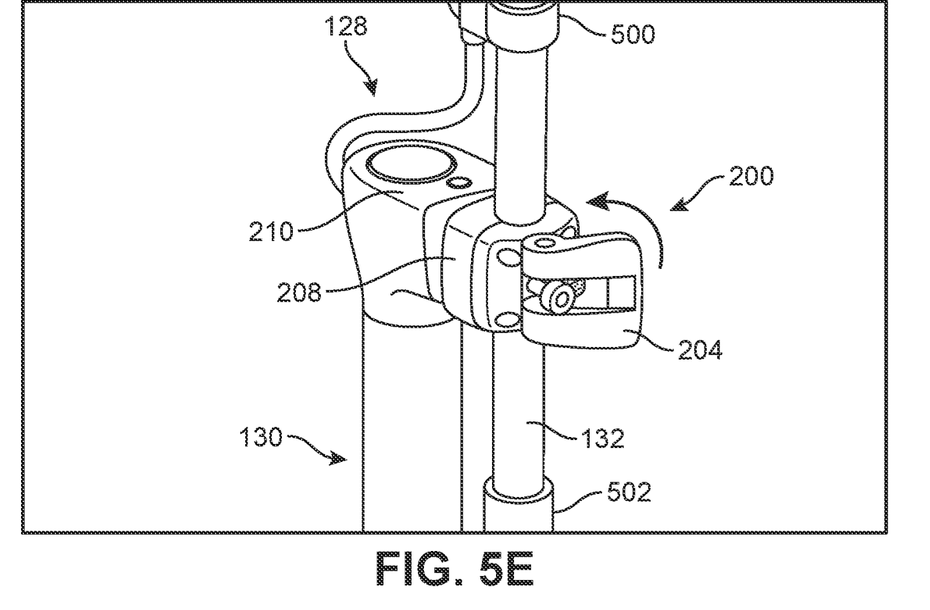

Referring now to FIG. 5E, steering assembly 128 is shown with handlebar 132 in a vertical orientation (e.g., parallel to steering shaft 130). In this embodiment, with handlebar 132 in the vertical orientation first end 500 of shaft 504 of handlebar 132 is facing upwards and second end 502 of shaft 504 of handlebar 132 is facing downwards. That is, as shown in FIG. 5E, handlebar 132 has rotated approximately ninety degrees via rotatable collar 208 to move from the horizontal orientation to the vertical orientation so that steering assembly 128 can be stowed inside of outer casing 102 of electric scooter 100 in the stowed configuration. In this embodiment, once handlebar 132 has been rotated to the vertical orientation, lever 204 of handlebar latching mechanism 200 may be pushed back towards steering assembly 128. Moving lever 204 back to its initial position also moves end 300 of pin 206 back into receiving aperture 302 of neck 210 of steering assembly 128 to lock rotatable collar 208 in place with handlebar 132 in the vertical orientation.

Figure 5F:
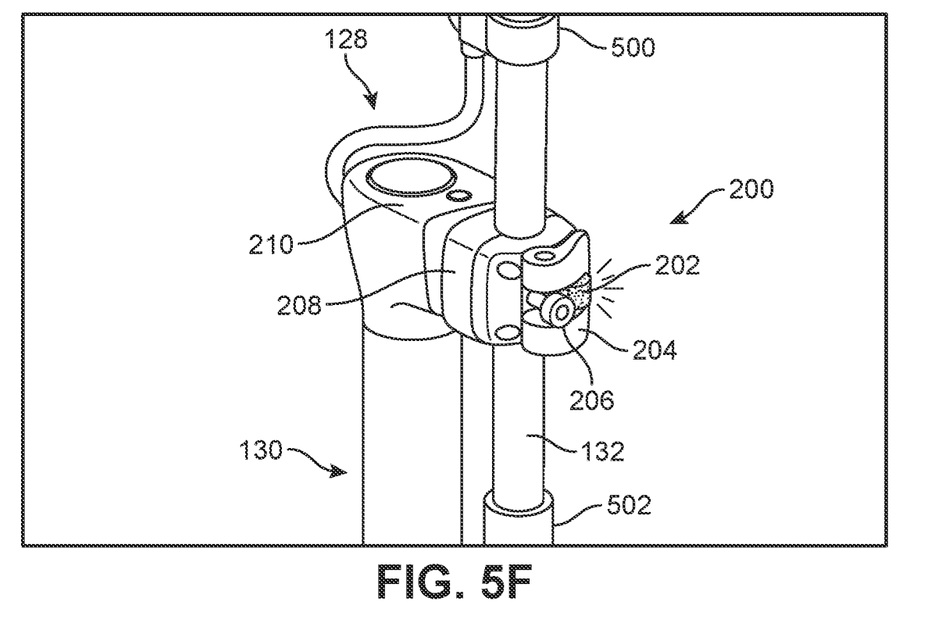

Finally, referring to FIG. 5F, locking tab 202 is moved back upwards away from pin 206 towards the top of the groove or channel in lever 204. In other embodiments, locking tab 202 may automatically move back once moving lever 204 has returned to its initial position. Once locking tab 202 is back in its initial locked position, handlebar latching mechanism 200 is in a locked configuration to prevent any rotation by rotatable collar 208. With this arrangement, when handlebar latching mechanism 200 is in the unlocked configuration, rotatable collar 208 can be rotated to move handlebar 132 from the horizontal orientation (in the riding configuration) to a vertical orientation (in the stowed configuration) and handlebar latching mechanism 200 can be moved back to the locked configuration to keep handlebar 132 in the vertical orientation while steering assembly 128 is folded inside of outer casing 102 of electric scooter 100 in the stowed configuration.

Referring now to FIGS. 6-9, steering assembly 128 of electric scooter 100 is shown in the process of being collapsed from the riding configuration to a stowed configuration. In this embodiment, handlebar 132 has already been rotated from the horizontal orientation to the vertical orientation, as described above in reference to FIGS. 5A-5F. In this embodiment, steering assembly 128 includes steering shaft 130 having upper portion 134 and a lower portion 600. A shaft connection mechanism 602 that includes a hinge (or similar mechanism) connects lower portion 600 and upper portion 134 of steering shaft 130. Upper portion 134 is connected to neck 210 at one end to shaft connection mechanism 602 at the opposite end. Lower portion 600 is connected to front wheel 114 via a fork at one end and to shaft connection mechanism 602 at the opposite end.

In the riding configuration, steering shaft 130 of steering assembly is in an extended position extending a first height (H1) above opening 120 and top edge 110 of outer casing 102 of electric scooter 100. As described above, in some embodiments, one or more portions of steering shaft 130 may be telescopic. For example, in this embodiment, upper portion 134 of steering shaft 130 is telescopic and includes a first segment 604 and a second segment 606. First segment 604 has an outside diameter that is smaller than an inside diameter of second segment 606 so that first segment 604 may slide or collapse into second segment 606.

In some embodiments, a user may initiate the process of collapsing steering assembly 128 of electric scooter 100 from the riding configuration to the stowed configuration by pressing release button 212 disposed at the top of neck 210 (as shown in FIGS. 2-4). Release button 212 is configured to allow a user to collapse steering shaft 130 from its extended position extending first height H1 above opening 120 and top edge 110 of outer casing 102 of electric scooter 100 to a collapsed position. That is, release button 212 may allow one or more telescopic portions of steering shaft 130 to collapse or slide into each other. In other embodiments, a user may engage a release level located on steering shaft 130 to allow one or more telescopic portions of steering shaft 130 to collapse or slide into each other.

Figure 7:
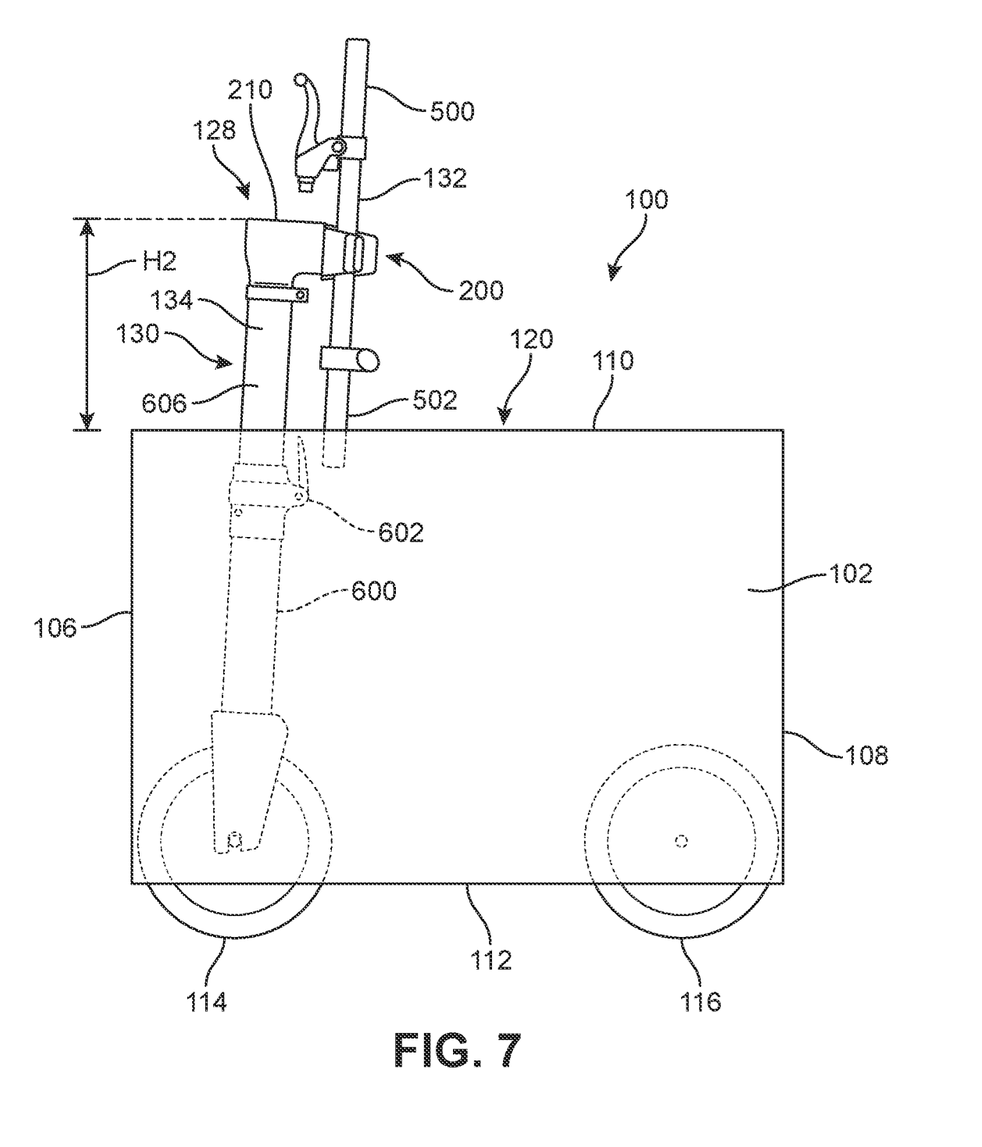
FIG. 7 is a representative side view of the example embodiment of the electric scooter showing a steering shaft being collapsed to transition from the riding configuration to the stowed configuration in accordance with aspects of the present disclosure.

For example, as shown in FIG. 7, first segment 604 has collapsed or slid into second segment 606 to move steering shaft 130 from its initial extended position to a shorter, collapsed position. In this embodiment, the collapsed position of steering shaft 130 extends a second height (H2) above opening 120 and top edge 110 of outer casing 102 of electric scooter 100. Second height H2 of steering shaft 130 in the collapsed position is smaller than first height H1 of steering shaft 130 in the extended position. Additionally, when the telescopic portions of steering shaft 130 (e.g., first segment 604 and second segment 606) move into each other, handlebar 132 moves at least partially into opening 120 at top edge 110 of outer casing 102 of electric scooter 100. For example, as shown in FIG. 7, second end 502 of handlebar 132 is shown extending into opening 120 at least partially inside outer casing 102 of electric scooter 100.

Figure 8:
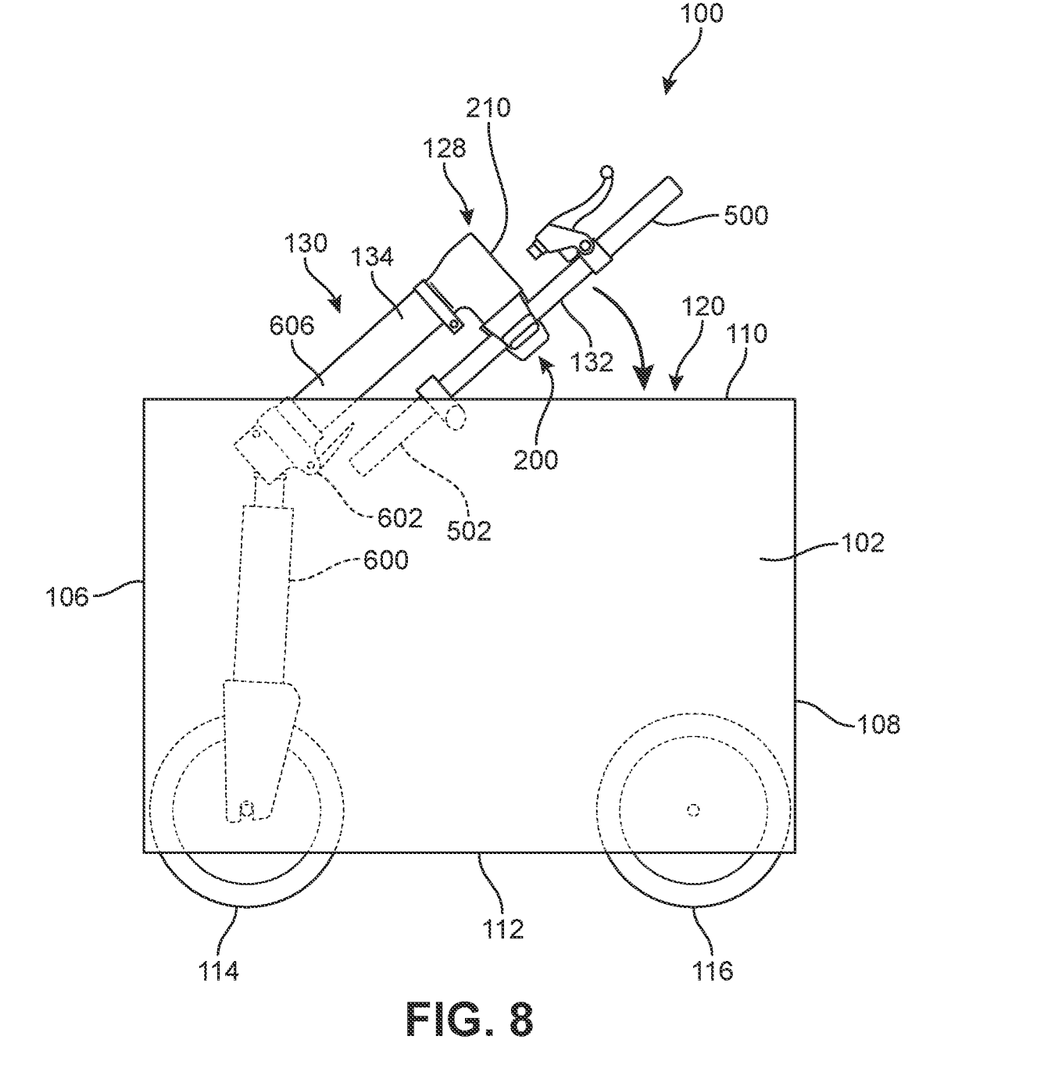
FIG. 8 is a representative side view of the example embodiment of the electric scooter showing the steering assembly being folded inside the electric scooter in accordance with aspects of the present disclosure.

Next, once steering shaft 130 has been collapsed, steering assembly 128 may be folded into outer casing 102 of electric scooter 100 through opening 120 at top edge 110. Referring now to FIG. 8, in this embodiment, steering assembly 128 is shown in an intermediate position in the process of being folded into outer casing 102 of electric scooter 100 through opening 120 as electric scooter 100 is being transitioned to the stowed configuration.

In an example embodiment, shaft connection mechanism 602 may be unlocked to allow steering shaft 130 to fold into opening 120. Shaft connection mechanism 602 may include a hinge or similar mechanism that allows upper portion 134 of steering shaft 130 to fold from a generally vertical orientation outside of outer casing 102 (e.g., when electric scooter 100 is in the riding configuration) to a generally horizontal orientation inside of outer casing 102 (e.g., when electric scooter 100 is in the stowed configuration). In this embodiment, lower portion 600 of steering shaft 130 remains stationary.

As shown in FIG. 8, when steering shaft 130 is folded at shaft connection mechanism 602, upper portion 134 of steering shaft 130 and handlebar 132 in the vertical orientation are folded into outer casing 102 of electric scooter 100 through opening 120 at top edge 110. That is, steering assembly 128 is being fully folded into outer casing 102 of electric scooter 100 in the stowed configuration.

Referring now to FIG. 9, electric scooter 100 is shown in its fully stowed configuration. In this embodiment, steering assembly 128, including handlebar 132 in the vertical orientation, is fully inside of outer casing 102 of electric scooter 100. When electric scooter 100 is collapsed from the riding configuration (as shown in FIG. 1) to the stowed configuration (as shown in FIG. 9), electric scooter 100 has a compact form factor that may be easily and conveniently carried by a user. By using handlebar latching mechanism 200 of the example embodiments, electric scooter 100 may be transitioned from the riding configuration to the stowed configuration to be easily and conveniently transported by a user. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A steering assembly for a personal transport device comprising:
   a telescopic steering shaft;
   a neck disposed at a top of the telescopic steering shaft;
   a rotatable collar connected via a rotation mechanism to the neck;
   a handlebar secured to the rotatable collar; and
   a handlebar latching mechanism;
   wherein the handlebar latching mechanism comprises:
      a lever;
      a locking tab disposed within a groove of the lever; and
      a pin, the pin having an end configured to fit into a receiving aperture in a face surface of the neck of the steering assembly;
      wherein the lever is configured to pull outwards away from the steering assembly to move the end of the pin out of the receiving aperture and permit the rotatable collar to rotate relative to the neck via the rotation mechanism;
      wherein the locking tab has a locked position at a top of the groove of the lever;
      wherein the locking tab is moved downwards from the top of the groove of the lever to an unlocked position; and
      wherein the lever is prevented from being pulled outwards when the locking tab is in the locked position and wherein the lever is permitted to be pulled outwards when the locking tab is in the unlocked position;
   wherein, in a locked configuration, the handlebar latching mechanism secures the rotatable collar from being rotated; and
   wherein, in an unlocked configuration, the handlebar latching mechanism permits the rotatable collar to rotate relative to the neck.

2. The steering assembly according to claim 1, wherein the rotatable collar is configured to rotate the handlebar from a horizontal orientation to a vertical orientation.

3. The steering assembly according to claim 2, wherein, in the horizontal orientation, the handlebar is perpendicular to the telescopic steering shaft; and
   wherein, in the vertical orientation, the handlebar is parallel to the telescopic steering shaft.

4. The steering assembly according to claim 1, wherein the telescopic steering shaft comprises:
   an upper portion connected to the neck at one end; and
   a lower portion connected to the upper portion at a shaft connection mechanism.

5. The steering assembly according to claim 4, wherein the shaft connection mechanism includes a hinge that permits the upper portion to fold relative to the lower portion.

6. The steering assembly according to claim 4, the upper portion of the steering shaft including a first segment and a second segment; and
   wherein the first segment has an outside diameter that is smaller than an inside diameter of the second segment so that the first segment may slide or collapse into the second segment.

7. F The steering assembly according to claim 1, further comprising a release mechanism;
   wherein the release mechanism is configured to allow the telescopic steering shaft to collapse from a first height to a second height that is smaller than the first height.

8. A handlebar latching mechanism for a steering assembly of a personal transport device comprising:
   a lever;
   a locking tab disposed within a groove of the lever;

a pin, the pin having an end configured to fit into a receiving aperture in a face surface of a neck of the steering assembly;
a rotatable collar connected to the neck via a rotation mechanism;
wherein the lever is configured to pull outwards away from the steering assembly to move the end of the pin out of the receiving aperture and permit the rotatable collar to rotate relative to the neck via the rotation mechanism;
wherein the locking tab has a locked position at a top of the groove of the lever;
wherein the locking tab is moved downwards from the top of the groove of the lever to an unlocked position; and
wherein the lever is prevented from being pulled outwards when the locking tab is in the locked position and wherein the lever is permitted to be pulled outwards when the locking tab is in the unlocked position.

9. The handlebar latching mechanism according to claim 8, wherein the locking tab is configured to slide within the groove between the top of the groove and a bottom of the groove to transition the handlebar latching mechanism between the locked position and the unlocked position.

10. The handlebar latching mechanism according to claim 8, wherein the rotatable collar is configured to secure a handlebar; and
wherein the rotatable collar is configured to rotate the handlebar from a horizontal orientation to a vertical orientation.

11. The handlebar latching mechanism according to claim 10, wherein the rotatable collar is configured to rotate ninety degrees in a clockwise or counterclockwise direction relative to the neck to rotate the handlebar from the horizontal orientation to the vertical orientation.

12. The handlebar latching mechanism according to claim 11, wherein the pin is configured to retain the rotatable collar in a position so that the handlebar is in a vertical orientation.

13. The handlebar latching mechanism according to claim 8, wherein the end of the pin is configured to be inserted back into the receiving aperture when the lever is moved back to its initial position towards the steering assembly.

14. A compact personal transport device comprising:
an outer casing extending between a top edge and a bottom edge in a vertical direction and extending between a front edge and a rear edge in a horizontal direction;
an opening disposed along a top surface of the outer casing;
a steering assembly configured to steer a front wheel of the compact personal transport device, wherein the steering assembly includes an upper portion extending a first height above the top surface of the outer casing when the compact personal transport device is in a riding configuration;
the steering assembly comprising:
a telescopic steering shaft;
a neck disposed at a top of the telescopic steering shaft;
a rotatable collar connected via a rotation mechanism to the neck;
a handlebar secured to the rotatable collar; and
a handlebar latching mechanism;
wherein the handlebar latching mechanism comprises:
a lever;
a locking tab disposed within a groove of the lever; and
a pin, the pin having an end configured to fit into a receiving aperture in a face surface of the neck of the steering assembly;
wherein the lever is configured to pull outwards away from the steering assembly to move the end of the pin out of the receiving aperture and permit the rotatable collar to rotate relative to the neck via the rotation mechanism;
wherein the locking tab has a locked position at a top of the groove of the lever;
wherein the locking tab is moved downwards from the top of the groove of the lever to an unlocked position; and
wherein the lever is prevented from being pulled outwards when the locking tab is in the locked position and wherein the lever is permitted to be pulled outwards when the locking tab is in the unlocked position;
wherein, in a locked configuration, the handlebar latching mechanism secures the rotatable collar from being rotated; and
wherein, in an unlocked configuration, the handlebar latching mechanism permits the rotatable collar to rotate relative to the neck.

15. The compact personal transport device according to claim 14, wherein the rotatable collar is configured to rotate the handlebar from a horizontal orientation to a vertical orientation.

16. The compact personal transport device according to claim 15, wherein, in the horizontal orientation, the handlebar is perpendicular to the telescopic steering shaft; and
wherein, in the vertical orientation, the handlebar is parallel to the telescopic steering shaft.

17. The compact personal transport device according to claim 14, wherein the telescopic steering shaft comprises:
an upper portion connected to the neck at one end; and
a lower portion connected to the upper portion at a shaft connection mechanism.

18. The compact personal transport device according to claim 14, wherein the upper portion of the telescopic steering shaft is configured to collapse into itself to extend a second height above the top surface of the outer casing, wherein the second height is smaller than the first height.

19. The compact personal transport device according to claim 14, wherein the locking tab is configured to slide within the groove between the top of the groove and a bottom of the groove to transition the handlebar latching mechanism between the locked position and the unlocked position.

20. The compact personal transport device according to claim 14, wherein the end of the pin is configured to be inserted back into the receiving aperture when the lever is moved back to its initial position towards the steering assembly.

* * * * *